(12) United States Patent
Sylvester et al.

(10) Patent No.: US 12,316,470 B2
(45) Date of Patent: *May 27, 2025

(54) SYSTEMS AND METHODS TO LINK MEETINGS WITH UNITS OF WORK OF A COLLABORATION ENVIRONMENT

(71) Applicant: Asana, Inc., San Francisco, CA (US)

(72) Inventors: David Strand Sylvester, Oakland, CA (US); Nina Trang Yi Dang, San Francisco, CA (US); Aaron Michael Gutierrez, San Francisco, CA (US); Seongik Kang, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 18/449,928

(22) Filed: Aug. 15, 2023

(65) Prior Publication Data

US 2023/0388138 A1 Nov. 30, 2023

Related U.S. Application Data

(63) Continuation of application No. 17/320,103, filed on May 13, 2021, now Pat. No. 11,792,028.

(51) Int. Cl.
*H04L 12/18* (2006.01)
*G06F 3/0483* (2013.01)
(Continued)

(52) U.S. Cl.
CPC ........ *H04L 12/1813* (2013.01); *G06F 3/0483* (2013.01); *G06F 3/04845* (2013.01); *G06Q 10/1095* (2013.01)

(58) Field of Classification Search
CPC ............. H04L 12/1813; H04L 12/1822; H04L 12/1827; G06Q 10/1095; G06F 3/0482; G06F 3/04842
See application file for complete search history.

(56) References Cited

U.S. PATENT DOCUMENTS

| 5,233,687 A | 8/1993 | Henderson, Jr. |
| 5,524,077 A | 6/1996 | Faaland |

(Continued)

FOREIGN PATENT DOCUMENTS

| CA | 2892290 A1 | 7/2014 |
| CN | 101305350 A | 11/2008 |

(Continued)

OTHER PUBLICATIONS

"U.S. Appl. No. 14/584,750, Examiner Interview Summary mailed Feb. 25, 2016", 3 pgs.

(Continued)

*Primary Examiner* — Caroline H Jahnige
(74) *Attorney, Agent, or Firm* — Esplin & Associates PC

(57) ABSTRACT

Systems and methods to link meetings with units of work of a collaboration environment are described herein. Exemplary implementations may: manage environment state information maintaining a collaboration environment; obtain input information conveying user input into work unit pages of units of work; in response to requests to generate meetings regarding individual units of work, generate and store resource information in individual work unit records of the individual units of work; obtain meeting information conveying content of the meetings; effectuate one or more actions within the collaboration environment based on the content of the meetings; and/or perform other operations.

20 Claims, 5 Drawing Sheets

(51) Int. Cl.
*G06F 3/04845* (2022.01)
*G06Q 10/1093* (2023.01)

(56) References Cited

U.S. PATENT DOCUMENTS

| | | |
|---|---|---|
| 5,530,861 A | 6/1996 | Diamant |
| 5,608,898 A | 3/1997 | Turpin |
| 5,611,076 A | 3/1997 | Durflinger |
| 5,623,404 A | 4/1997 | Collins |
| 5,721,770 A | 2/1998 | Kohler |
| 5,983,277 A | 11/1999 | Heile |
| 6,024,093 A | 2/2000 | Cron |
| 6,256,651 B1 | 7/2001 | Tuli |
| 6,292,830 B1 | 9/2001 | Taylor |
| 6,332,147 B1 | 12/2001 | Moran |
| 6,385,639 B1 | 5/2002 | Togawa |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,349,920 B1 | 3/2008 | Feinberg |
| 7,418,482 B1 | 8/2008 | Lusher |
| 7,428,723 B2 | 9/2008 | Greene |
| 7,640,511 B1 | 12/2009 | Keel |
| 7,676,542 B2 | 3/2010 | Moser |
| 7,698,160 B2 | 4/2010 | Beaven |
| 7,779,039 B2 | 8/2010 | Weissman |
| 7,805,327 B1 | 9/2010 | Schulz |
| RE41,848 E | 10/2010 | Daniell |
| 7,890,405 B1 | 2/2011 | Robb |
| 7,904,322 B2 | 3/2011 | Gauger |
| 7,904,323 B2 | 3/2011 | Wynn |
| 7,917,855 B1 | 3/2011 | Satish |
| 7,996,744 B2 | 8/2011 | Ojala |
| 7,996,774 B1 | 8/2011 | Sidenur |
| 8,214,747 B1 | 7/2012 | Yankovich |
| 8,254,890 B2 | 8/2012 | Hung |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,002,345 B2 | 6/2018 | Ganani |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Rosenstein |
| 11,095,468 B1 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,265,183 B1 | 3/2022 | Iyer |
| 11,282,036 B1 | 3/2022 | Hood |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 11,792,028 B1 | 10/2023 | Sylvester |
| 2001/0049087 A1 | 12/2001 | Hale |
| 2002/0065798 A1 | 5/2002 | Bostleman |
| 2002/0082889 A1 | 6/2002 | Oliver |
| 2002/0143594 A1 | 10/2002 | Kroeger |
| 2002/0188597 A1* | 12/2002 | Kern ............... G06Q 30/06 |
| 2003/0018510 A1 | 1/2003 | Sanches |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0106039 A1 | 6/2003 | Rosnow |
| 2003/0126001 A1 | 7/2003 | Northcutt |
| 2003/0200223 A1 | 10/2003 | Hack |
| 2003/0217034 A1 | 11/2003 | Shutt |
| 2003/0225598 A1 | 12/2003 | Yu |
| 2003/0233265 A1 | 12/2003 | Lee |
| 2003/0233268 A1 | 12/2003 | Taqbeem |
| 2004/0030992 A1 | 2/2004 | Moisa |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0044145 A1 | 2/2005 | Quinn |
| 2005/0097440 A1 | 5/2005 | Lusk |

(56) References Cited

U.S. PATENT DOCUMENTS

| | | |
|---|---|---|
| 2005/0210394 A1 | 9/2005 | Crandall |
| 2005/0216111 A1 | 9/2005 | Ooshima |
| 2005/0222971 A1 | 10/2005 | Cary |
| 2005/0223314 A1 | 10/2005 | Varadarajan |
| 2006/0028917 A1 | 2/2006 | Wigginton |
| 2006/0047454 A1 | 3/2006 | Tamaki |
| 2006/0053196 A1 | 3/2006 | Spataro |
| 2006/0085245 A1 | 4/2006 | Takatsuka |
| 2006/0095859 A1 | 5/2006 | Bocking |
| 2006/0106872 A1 | 5/2006 | Leban |
| 2006/0136441 A1 | 6/2006 | Fujisaki |
| 2006/0143270 A1 | 6/2006 | Wodtke |
| 2006/0167736 A1 | 7/2006 | Weiss |
| 2006/0168550 A1* | 7/2006 | Muller ............ G06Q 10/06 707/999.102 |
| 2006/0190391 A1 | 8/2006 | Cullen, III |
| 2006/0200264 A1 | 9/2006 | Kodama |
| 2006/0200374 A1 | 9/2006 | Nelken |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0233545 A1 | 10/2007 | Cala |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0288292 A1* | 12/2007 | Gauger ............ G06Q 10/063 405/9 |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0134069 A1 | 6/2008 | Horvitz |
| 2008/0147471 A1 | 6/2008 | Singh |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0006982 A1 | 1/2009 | Curtis |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0192845 A1 | 7/2009 | Gudipaty |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0235182 A1 | 9/2009 | Kagawa |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307045 A1 | 12/2009 | Chakra |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169359 A1 | 7/2010 | Barrett |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0258015 A1 | 10/2011 | Garrigan |
| 2011/0270644 A1 | 11/2011 | Roncolato |
| 2011/0307100 A1 | 12/2011 | Schmidtke |
| 2011/0307598 A1 | 12/2011 | Orr |
| 2011/0307772 A1 | 12/2011 | Lloyd |
| 2012/0013114 A1 | 1/2012 | Glosh |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0179981 A1 | 7/2012 | Whalin |
| 2012/0192086 A1 | 7/2012 | Ghods |
| 2012/0221963 A1 | 8/2012 | Motoyama |
| 2012/0239451 A1 | 9/2012 | Caligor |
| 2012/0240194 A1 | 9/2012 | Nack Ngue |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0024452 A1 | 1/2013 | Defusco |
| 2013/0060593 A1 | 3/2013 | Motoyama |
| 2013/0066944 A1 | 3/2013 | Laredo |
| 2013/0067375 A1 | 3/2013 | Kim |
| 2013/0067549 A1 | 3/2013 | Caldwell |

(56) References Cited

U.S. PATENT DOCUMENTS

| | | |
|---|---|---|
| 2013/0073328 A1 | 3/2013 | Ehrler |
| 2013/0103412 A1 | 4/2013 | Nudd |
| 2013/0110937 A1 | 5/2013 | Burns |
| 2013/0117060 A1 | 5/2013 | Henriksen |
| 2013/0124638 A1 | 5/2013 | Barreto |
| 2013/0130217 A1 | 5/2013 | Dohring |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0311222 A1 | 11/2013 | Harsha |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2013/0339969 A1 | 12/2013 | Koski |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Taber |
| 2014/0040780 A1 | 2/2014 | Brian |
| 2014/0040905 A1 | 2/2014 | Tadanobu |
| 2014/0058801 A1 | 2/2014 | Deodhar |
| 2014/0059910 A1 | 3/2014 | Norton |
| 2014/0067455 A1 | 3/2014 | Zhang |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0164510 A1 | 6/2014 | Abuelsaad |
| 2014/0165001 A1 | 6/2014 | Shapiro |
| 2014/0172478 A1 | 6/2014 | Vadasz |
| 2014/0188585 A1 | 7/2014 | Thompson, Jr. |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0237041 A1 | 8/2014 | Bhat |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0310345 A1 | 10/2014 | Megiddo |
| 2014/0350997 A1 | 11/2014 | Holm |
| 2014/0364987 A1 | 12/2014 | Shikano |
| 2015/0006448 A1 | 1/2015 | Gupta |
| 2015/0007056 A1 | 1/2015 | Cohen |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0135095 A1 | 5/2015 | Donneau-Golencer |
| 2015/0153906 A1 | 6/2015 | Liao |
| 2015/0154291 A1 | 6/2015 | Shepherd |
| 2015/0186850 A1 | 7/2015 | Ramji |
| 2015/0213411 A1 | 7/2015 | Swanson |
| 2015/0215256 A1 | 7/2015 | Ghafourifar |
| 2015/0262111 A1 | 9/2015 | Yu |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0092578 A1 | 3/2016 | Ganani |
| 2016/0104120 A1 | 4/2016 | Agrawal |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0142471 A1 | 5/2016 | Tse |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Vida |
| 2016/0216854 A1 | 7/2016 | McClellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0313934 A1 | 10/2016 | Isherwood |
| 2016/0328217 A1 | 11/2016 | Hagerty |
| 2016/0342927 A1 | 11/2016 | Reznik |
| 2016/0344718 A1 | 11/2016 | Pashman |
| 2016/0371352 A1 | 12/2016 | Kohlmeier |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0053303 A1 | 2/2017 | Smyth |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0249577 A1 | 8/2017 | Nishikawa |
| 2017/0310716 A1 | 10/2017 | Lopez Venegas |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2017/0364866 A1 | 12/2017 | Steplyk |
| 2018/0032524 A1 | 2/2018 | Byron |
| 2018/0039951 A1 | 2/2018 | Wynn |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0082255 A1 | 3/2018 | Rosati |
| 2018/0088754 A1 | 3/2018 | Psenka |
| 2018/0089625 A1 | 3/2018 | Rosati |
| 2018/0095938 A1 | 4/2018 | Monte |
| 2018/0101281 A1 | 4/2018 | Nelson |
| 2018/0101760 A1 | 4/2018 | Nelson |
| 2018/0102989 A1 | 4/2018 | Borsutsky |
| 2018/0114172 A1 | 4/2018 | Togwe |

(56) References Cited

U.S. PATENT DOCUMENTS

| | | |
|---|---|---|
| 2018/0131649 A1 | 5/2018 | Ma |
| 2018/0137469 A1 | 5/2018 | Biehl |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0198746 A1 | 7/2018 | Bastide |
| 2018/0225636 A1 | 8/2018 | Kumhyr |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285471 A1 | 10/2018 | Hao |
| 2018/0316636 A1 | 11/2018 | Kamat |
| 2018/0331842 A1 | 11/2018 | Faulkner |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0050812 A1 | 2/2019 | Boileau |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0108493 A1 | 4/2019 | Nelson |
| 2019/0132265 A1 | 5/2019 | Nowak-Przygodzki |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0258704 A1 | 8/2019 | Mertens |
| 2019/0259387 A1 | 8/2019 | Mertens |
| 2019/0265821 A1 | 8/2019 | Pearl |
| 2019/0273767 A1 | 9/2019 | Nelson |
| 2019/0318321 A1 | 10/2019 | Lopez Venegas |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2019/0378076 A1 | 12/2019 | O'Gorman |
| 2020/0005248 A1 | 1/2020 | Gerzi |
| 2020/0019907 A1 | 1/2020 | Notani |
| 2020/0059539 A1 | 2/2020 | Wang |
| 2020/0065736 A1 | 2/2020 | Relangi |
| 2020/0111046 A1 | 4/2020 | Ball-Marian |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0242524 A1 | 7/2020 | Soundararajan |
| 2020/0244611 A1 | 7/2020 | Rosenstein |
| 2020/0302817 A1 | 9/2020 | Williams |
| 2020/0328906 A1 | 10/2020 | Raghavan |
| 2020/0344253 A1 | 10/2020 | Kurup |
| 2020/0372436 A1 | 11/2020 | Lee |
| 2020/0403817 A1 | 12/2020 | Daredia |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0157978 A1 | 5/2021 | Haramati |
| 2021/0182475 A1 | 6/2021 | Pelz |
| 2021/0216562 A1 | 7/2021 | Smith |
| 2021/0232282 A1 | 7/2021 | Karpe |
| 2021/0320891 A1 | 10/2021 | Rosenstein |
| 2021/0342786 A1 | 11/2021 | Jiang |
| 2021/0382734 A1 | 12/2021 | Rosenstein |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0147943 A1 | 5/2022 | Hood |
| 2022/0158859 A1 | 5/2022 | Raghavan |
| 2022/0215344 A1 | 7/2022 | Hood |
| 2022/0263675 A1 | 8/2022 | Cupala |
| 2023/0071838 A1 | 3/2023 | Hood |
| 2024/0428195 A1 | 12/2024 | Hood |

FOREIGN PATENT DOCUMENTS

| | | | |
|---|---|---|---|
| CN | 101563671 | A | 10/2009 |
| CN | 102378975 | B | 5/2015 |
| JP | 2005216287 | A | 8/2005 |
| WO | 2015036817 | A1 | 3/2015 |
| WO | 2015123751 | A1 | 8/2015 |
| WO | 2020006634 | A1 | 1/2020 |

OTHER PUBLICATIONS

"U.S. Appl. No. 14/584,750, Non Final Office Action mailed Aug. 28, 2015", 21 pgs.

"U.S. Appl. No. 14/584,750, Notice of Allowance mailed Mar. 28, 2016", 8 pgs.

"U.S. Appl. No. 14/584,750, Response filed Feb. 29, 2015 to Non Final Office Action mailed Aug. 28, 2015", 16 pgs.

"U.S. Appl. No. 14/584,850, Final Office Action mailed Sep. 1, 2017", 31 pgs.

"U.S. Appl. No. 14/584,850, Non Final Office Action mailed Jan. 10, 2017", 9 pgs.

"U.S. Appl. No. 14/584,850, Response filed Apr. 10, 2017 to Non Final Office Action mailed Jan. 10, 2017", 13 pgs.

"How to Asana: Inviting teammates to Asana." YouTube, Asana, Mar. 21, 2017, https://www.youtube.com/watch?v=TLOruY1KyxU ( Year: 2017), 13 pages.

"Rules of Data Conversion from Document to Relational Databases", published: 2014, publisher: Future-processing, pp. 1-8 (Year: 2014).

(Tiburca, Andrew) Best Team Calendar Applications for 2018— Toggl https://toggl.com/blog/best-team-calendar-applications-for-2018 (Year: 2017) 3 pages.

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios, youtube, excerpt, Aug. 1, 2019 https://www.youtube.com/watch?v=7XkNcfFDG6M (Year: 2019) (20 pages).

Asana YouTube channel, list of all product videos, Nov 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana, Manage your team capacity with Workload, youtube, excerpt, Aug. 1, 2019 https://www.youtube.com/watch?v=2ufXyZDzZnA &list=PLJFG93oi0wJAi UwyOhIGWHdtJzJrzyIBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

(56) References Cited

OTHER PUBLICATIONS

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

Command and control, wikipedia, archives org, Mar. 16, 2018 https://web.archive.org/web/20180316193655/https://en.wikipedia.org/wiki/Command_and_control (Year: 2018), 6 pages.

Creating Tables with Fields from 2 Different Tables, published: 2009, publisher: StackOverflow, pp. 1-2. (Year: 2009).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/ https://en.wikipedia.org/wiki/Critical_path_method (Year: 2017) 6 pages.

Dawei Li, "Deepcham: Collaborative Edge-Mediated Adaptive Deep Learning for Mobile Object Recognition", 2016, IEEE/ACM, pp. 64-76. (Year: 2016).

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

G. Fakas and B, Karakostas, A workflow management system based on intelligent collaborative objects, May 11, 1999, Information and Software Technology, vol. 41, p. 907-915. (Year: 1999).

Hartmann, "TimeProjectscheduling with resource capacities and requests varying with time: a case study," 2013, Flexible services and manufacturing journal, vol. 25, No. 1, pp. 74-93 (Year: 2013).

Helen Mongan-Rallis & Terrie Shannon, "Synchronous Chat," Aug. 2016, Dept. of Education, Univ. of MN Duluth, web. archive.org/web/20160825183503/https://www.d.umn.edu/hrallis/professional/presentations/cotfsp06/indiv_tools/sync_chat.htm (Year: 2016) (2 pages).

How to Asana Asana time tracking, youtube, excerpt, May 24, 2017 https://www.youtube.com/watch?v=z91qlex-TLc (Year: 2017) (1 page).

How to Asana, Asana project management, youtube, excerpt, Mar. 7, 2017 https://www.youtube.com/watch?v=qqANMTvVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv3o (Year: 2017) (24 pages).

How to Asana, Planning with Asana calendar, youtube excerpt, Feb. 14, 2017 https://www.youtube.com/watch?v=w8t6KYiVPyc (Year: 2017) (19 pages).

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

Justin Rosenstein, Unveiling the Future of Asana, Mar. 28, 2018 https://www.youtube.com/watch?v=nRI?d_WM4Bc (Year: 2018) (2 pages).

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

Macro, computer science, wikipedia, archives org, 6 pages, Feb. 11, 2020 http://web.archive.org/web/20200211082902/https://en.wikipedia.org/wiki/Macro_(computer_science) (Year: 2020) 6 pages.

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).

Paul Minors, How to automate your tasks, youtube excerpts, Oct. 18, 2019 https://www.youtube.com/watch? v=lwF9XyUQrzw (Year: 2019).

Prioritize My Tasks in Asana, Asana tutorial, youtube, excerpt, May 25, 2016 https://www.youtube.com/watch?v=UbCnMvw01nl (Year: 2016) (3 pages).

Project views, Asana tutorial, youtube, excerpt May 25, 2016 https://www.youtube.com/watch?v=FYjA8ZH3ceQ (Year: 2016) (5 pages).

Schwarz "How to Design an Agenda for an Effective Meeting" (2015) (https://hbr.org/2015/03/ how-to-design-an-agenda-for-an-effective-meeting). (Year: 2015) 8 pages.

Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https://web.archive.org/web/20170708150928/https://asana.com/guide/resources/infosheets/where-does-asana-fit (Year: 2017) (5 pages).

Wix.com, How to Use Wix Code with Marketing Tools to Create Custom Events, Oct. 18, 2018, YouTube, https://www.youtube.com/watch?v=MTBVykOYGvO&feature=emb_title, 2 pages.

www.asana.com (as retrieved from https://web.archive.Org/web/20160101054536/https://asana.com/press and https://web.archive.org/web/20160101054527/https://asana.com/product) (Year: 2016) 15 pages.

www.cogmotive.com/blog/author/alan Alan Byrne: "Creating a company Shared Calendar in Office 365"; pp. 1-17; Sep. 10, 2013 (16 pages).

* cited by examiner

SYSTEMS AND METHODS TO LINK MEETINGS WITH UNITS OF WORK OF A COLLABORATION ENVIRONMENT

FIELD OF THE DISCLOSURE

The present disclosure relates to systems and methods to link meetings with units of work of a collaboration environment.

BACKGROUND

Collaboration environments, sometimes referred to as work management platforms, may enable users to assign projects, tasks, or other assignments to assignees (e.g., other users) to complete. A collaboration environment may comprise an environment in which individual users and/or a virtual team of users does its work and may enable users to work in a more organized and efficient manner.

SUMMARY

One aspect of the present disclosure relates to a system configured to link meetings with units of work of a collaboration environment. Traditionally, users may manually create units of work within a collaboration environment that represent meetings conducted outside of the collaboration environment. When the meeting is concluded, a user may typically have to manually update the units of work and/or perform other follow-up actions in a collaboration environment to reflect what happened in the meeting. This is time consuming and may be prone to user error. Accordingly, one or more implementations presented herein propose a way to link units of work within a collaboration environment to meetings conducted using meeting resources. The linking may provide a seamless integration between the collaboration environment and a meeting resource so that content of meetings conducted using the meeting resource are reflected in the collaboration environment, and/or actions within the collaboration environment are reflected in the meeting resource. By way of non-limiting illustration, when a meeting is linked to a unit of work, agenda items of an agenda may be dynamically created for the meeting based on information gathered in the collaboration environment. Once the meeting has concluded and/or during the course of the meeting, the agenda items may be addressed which may cause an update in the collaboration environment. During the meeting, an agenda may be interactive where there is an agenda display portion included in a meeting interface. In some implementations, interacting with the agenda display portion within the meeting interface may cause modifications and/or updates to work information related to individual units of work discussed in the meeting. It is noted that such linking may also be carried out with projects and/or other records described herein and is not to be considered limited to units of work only.

One or more implementations of a system to link meetings with units of work of a collaboration environment may include one or more hardware processors configured by machine-readable instructions and/or other components. Executing the machine-readable instructions may cause the one or more hardware processors to facilitate linking meetings with units of work within a collaboration environment. The machine-readable instructions may include one or more computer program components. The one or more computer program components may include one or more of an environment state component, a user input component, a meeting interface component, a content component, and/or other components.

The environment state component may be configured to manage environment state information maintaining a collaboration environment and/or other information. The collaboration environment may be configured to facilitate interaction by users with the collaboration environment. The environment state information may define one or more records. The one or more records may include one or more of work unit records, project records, and/or other records. The work unit records may include work information comprising values of work unit parameters defining units of work managed, created, and/or assigned to the users within the collaboration environment. By way of non-limiting illustration, the work unit records may include a first work unit record including first work information for a first unit of work.

The user input component may be configured to obtain input information conveying user input into work unit pages of the units of work and/or other pages. Individual work unit pages may provide access to individual units of work. The user input may include requests to generate meetings regarding the individual units of work with one or more of the users of the collaboration environment. A meeting regarding a unit of work may include a meeting about one or more of the unit of work, users linked to the unit of work, other units of work linked to the unit of work, project(s) supported by the unit of work, and/or other topics. By way of non-limiting illustration, the input information may convey a first user input by the first user into a first work unit page of the first unit of work. The first user input may include a first request to generate a first meeting regarding the first unit of work with a second user and/or other users.

In some implementations, in response to the requests to generate the meetings regarding the individual units of work, the environment state component may be configured to generate and store resource information in individual work unit records of the individual units of work (and/or other records) in response to the requests to generate the meetings regarding the individual units of work. The resource information may include meeting resource identifiers that facilitate access to a meeting interface. By non-limiting illustration, storing the resource information in the individual work unit records of the individual units of work may cause individual meeting resource identifiers to be presented in the individual work unit pages. In some implementations, in response to the first request, first resource information may be stored in the first work unit record. The first resource information may include a first meeting resource identifier facilitating access to a meeting interface for the first meeting, and/or other information.

The meeting interface component may be configured to effectuate presentation of the meeting interface through which the users conduct the meetings. The meeting interface may include an agenda display portion displaying agenda information for the individual meetings.

The content component may be configured to obtain meeting information conveying content of the meetings. In some implementations, first meeting information conveying first content of the first meeting may be obtained.

In some implementations, the environment state component may be configured to effectuate one or more actions within the collaboration environment based on the content of the meetings. The environment state component may be configured to store results of the one or more actions in the environment state information. By non-limiting illustration, a first set of one or more actions may be effectuated in the collaboration environment based on the first content. Results of the first set of one or more actions may be stored in the environment state information.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
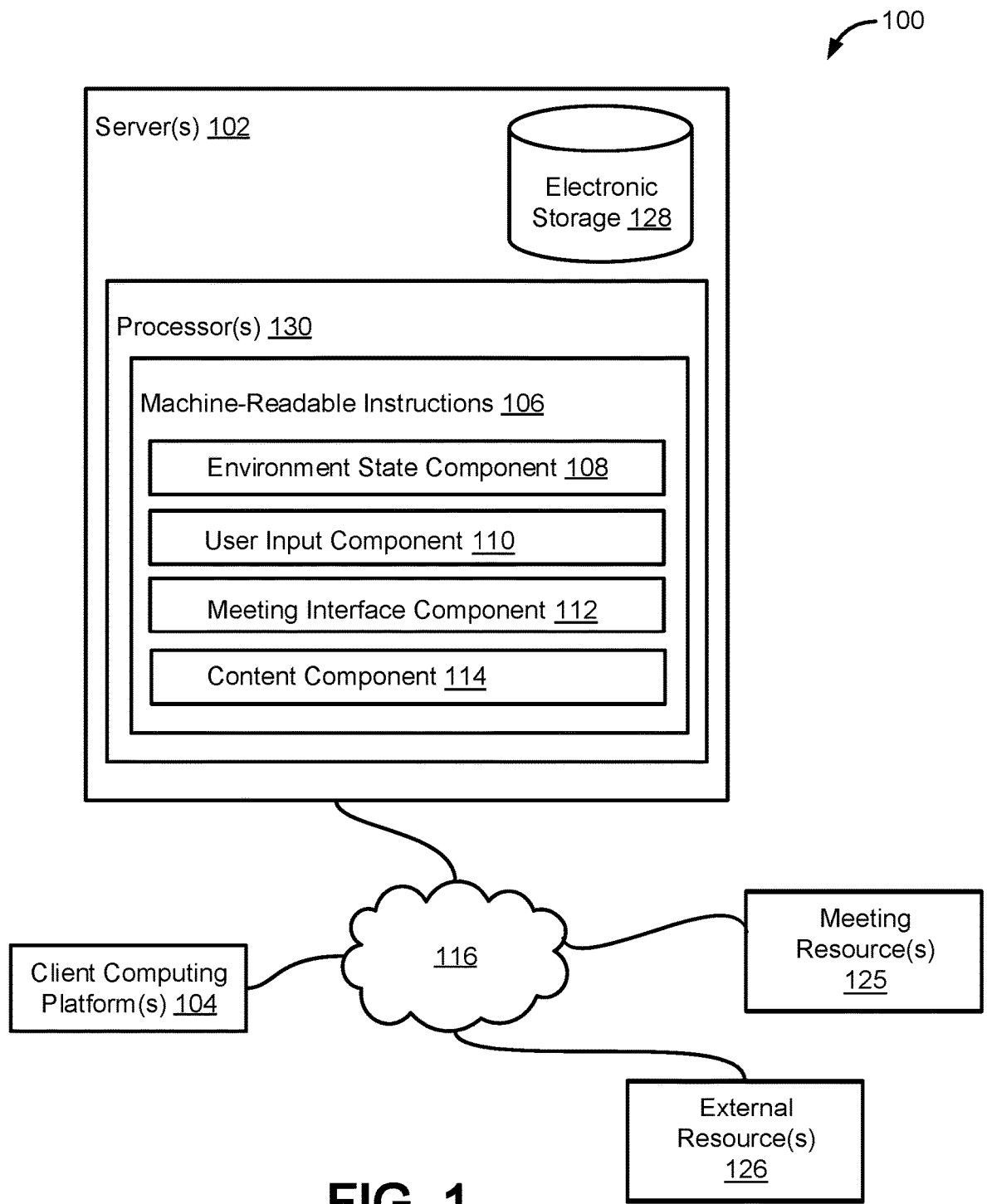
FIG. 1 illustrates a system configured to link meetings with units of work of a collaboration environment, in accordance with one or more implementations.

FIG. 1 illustrates a system 100 configured to link meetings with units of work of a collaboration environment, in accordance with one or more implementations. It is noted that such linking may also be carried out with projects and/or other records described herein and is not to be considered limited to units of work only.

Coordinating meetings between users may take some manual preparation prior to a meeting date, such as scheduling the meeting date and/or gathering information pertinent to the meeting to create an agenda. Even after completion of the meeting, there may be more manual effort required from users of the meeting to summarize the information covered in the meeting and/or take actions according to agenda items discussed in the meeting. One or more implementations of the system 100 may be configured to facilitate generating meetings in response to a user's request input in a collaboration environment. Generating a meeting may further generate an agenda for the meeting as well as a meeting interface that incorporates the agenda information. The agenda may be interactive where there is an agenda display portion included in the meeting interface. In some implementations, interacting with the agenda display portion within the meeting interface may modify work information for units of work within the collaboration environment.

In some implementations, system 100 may include one or more of one or more servers 102, one or more client computing platforms 104, external resource(s) 126, one or more meeting resources 125, and/or other components. Server(s) 102 may be configured to communicate with one or more client computing platforms 104, one or more meeting resources 125, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

One or more meeting resources 125 may including application programs and/or services configured to facilitate meetings between users. The meetings may include one or more of video meetings, audio meetings, text-based meetings, and/or other meetings. A meeting resource may be configured to implement an instance of a meeting through one or more meeting interfaces. A meeting resource may be configured to receive and/or transmit the communications (e.g., textual communications, voice communications, video communications, etc.) that make up a meeting to and/or from client computing platform(s) 104 and server(s) 102. A meeting interface may be part of and/or external to the collaboration environment. A meeting interface may be hosted by the collaboration environment and/or one or more third party applications integrated with the collaboration environment via an application program interface (API). A meeting interface may include its own interface and/or a portion a user interface of the collaboration environment.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to facilitate linking meetings with units of work of a collaboration environment. The computer program components may include one or more of an environment state component 108, user input component 110, meeting interface component 112, content component 114, and/or other components.

Environment state component 108 may be configured to manage environment state information and/or other information used in maintaining a collaboration environment. The collaboration environment may be configured to facilitate interaction by users with the collaboration environment. The environment state information may include one or more of user records, work unit records, project records, objective records, and/or other records. The user records may include user information comprising values of user parameters. The work unit records which may include work information comprising values for work unit parameters associated with units of work managed, created, and/or assigned within the collaboration environment. By way of non-limiting illustration, the work unit records may include a first work unit record including first work information for a first unit of work. The project records may include project information including values for project parameters associated with projects managed within the collaboration environment. An individual project may include an individual set of the units of work.

The user information in the user records may include values of user parameters. The values of the user parameters may be organized in the user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group parameter, a user account, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, and/or other information.

User role information may specify individual roles of the individual users. A role may represent a position of an individual user. The position may be specified based on a description of one or more of a job title, level, stage, and/or other descriptions of position. The role may be specified with respect to a business organization as a whole and/or other specifications. By way of non-limiting illustration, a role may include one or more of chief executive officer (or other officer), owner, manager, supervisor, accountant, associate, employee, intern, entry level, midlevel, senior, administrator, director, foreman, engineer, product developer, human resource officer, artist, art director, and/or other descriptions.

In some implementations, user role information may specify roles of the users within the units of work and/or the projects. The roles may convey expected contribution of the users in completing and/or supporting the units of work and/or the projects. The individual roles of individual users within the units of work may be specified separately from the individual roles of the individual users within the projects. The individual roles of individual users within the units of work and/or projects may be specified separately from the individual roles of the individual users within a business organization as a whole.

The work information in the work unit records may include values of one or more work unit parameters. The values of the work unit parameters may be organized in work unit records corresponding to units of work managed, created, and/or assigned within the collaboration environment. A given unit of work may have one or more assignees and/or collaborators working on the given work unit. Units of work may include one or more to-do items, action items, objectives, and/or other units of work one or more users should accomplish and/or plan on accomplishing. Units of work may be created by a given user for the given user and/or created by the given user and assigned to one or more other users. Individual units of work may include one or more of an individual task, an individual sub-task, and/or other units of work assigned to and/or associated with one or more users. Individual units of work may include one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, being assigned a role at the unit of work level, and/or other actions.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, the one or more work unit parameters may include one or more of a work assignment parameter, work completion parameter, a work management parameter, work creation parameter, and/or other parameters. The values of the work assignment parameter may describe units of work assigned to the individual users. The values of the work management parameter may describe units of work managed by the individual users. The values of the work creation parameter may describe units of work created by the individual users.

In some implementations, values of work unit parameters may include one or more of a unit of work name, a unit of work description, one or more unit of work dates (e.g., a start date, a due date or end date, a completion date, and/or dates), one or more members associated with a unit of work (e.g., an owner, one or more other project/task collaborators, collaborator access information, and/or other unit of work collaborators and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), one or more performance/productivity metrics for a given unit of work, hierarchical information, one or more custom fields (e.g., priority, cost, stage, and/or other custom fields), and/or other information.

The values of the work assignment parameter describing units of work assigned to the individual users may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work completion parameter may indicate that a completion status of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

In some implementations, managing the environment state component 108 may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more of a list view, a calendar view, and/or other views. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.).

Project information in project records may define values of project parameters for projects managed within the collaboration environment. The project parameters may characterize one or more projects managed within the collaboration environment and/or via the collaboration environment, and/or the metadata associated with the one or more projects. Individual ones of the projects may be associated with individual ones of the project records. The project information may define values of the project parameters associated with a given project managed within the collaboration environment and/or via the collaboration environment. A given project may have one or more owners and/or one or more collaborators working on the given project. The given project may include one or more units of work assigned to one or more users under the given project heading. In some implementations, projects may include one or more units of work that may directly facilitate progress toward fulfillment of the projects. Accordingly, completion of units of work may directly contribute to progress toward fulfillment of the project. By way of non-limiting illustration, an individual project may be associated with a client and the units of work under the individual project heading may be work directly contributing to the fulfillment of a business relationship with the client.

In some implementations, activities that impact the progress toward completion of the individual projects may be reflected by changes in the values of one or more of the work unit parameters and/or the values of one or more of the project parameters.

The values of the project parameters may, by way of non-limiting example, include one or more of: one or more units of work within individual ones of the projects (which may include values of work unit parameters defined by one or more work unit records), status information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, projects created by, assigned to, and/or completed by the users may refer generally to a linking of the projects with the individual users in the collaboration environment. A project may be linked with a user in a manner that defines one or more relationships between the user and the project. Such a relationship may connote and/or be a result of an action (past, present, and/or future) of the user with respect to the project. Such actions may include one or more of creating a project record for a project, being assigned to participate in a project, participating in a project, being granted access to a project record of a project, adjusting a value of a project parameter of a project record of a project, being assigned a project-level role, and/or other actions.

The objective information in objective records may include values of one or more objective parameters. The values of the objective parameters may be organized in objective records corresponding to business objectives managed, created, and/or owned within the collaboration environment. A given business objective may have one or more collaborators, and/or team members working on the given business objective. Business objectives may include one or more associated units of work and/or projects one or more users should accomplish and/or plan on accomplishing. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users.

The business objectives may be associated with a set of units of work and/or projects that may indirectly facilitate progress toward fulfillment of the business objectives. The set of units of work and/or projects may not directly contribute to the progress. By way of non-limiting illustration, a connection between the set of units of work and/or projects and a corresponding business objective may be indirect in that completion of at least one of the units of work and/or projects may have no direct impact on progress toward fulfillment of the business objective. The concept of "no direct impact" may mean that completion of the at least one unit of work and/or project may not cause progress toward fulfillment of the business objective without independent action outside of the at least one unit of work and/or project. Instead, the fulfillment of the at least one unit of work and/or project may make such independent action more likely (e.g., through coercion, assistance, education, incentivization, reminder, etc.). However, in some implementations, business objectives may be associated with a set of units of work and/or projects that may directly facilitate progress toward fulfillment of the business objectives. Accordingly, completion of the set of units of work and/or projects may directly contribute to the progress toward fulfillment. Business objectives may be associated with an objectives and key result (OKR) goal-setting framework. Business objectives may be specified on one or more of a team basis, organization basis, and/or other specifications. In some implementations, business objectives may be characterized as user objectives. The user objectives may be associated with a set of units of work and/or projects that may indirectly (and/or directly) facilitate progress toward fulfillment of the user objectives. User objectives may be specified on an individual user basis.

Individual objective records may describe individual business objectives and identify sets of individual ones of the work unit records and/or project records that specify the units of work and/or projects as being associated with the individual business objectives.

Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. For example, the objective records may further include a second objective record. The first objective record and the second objective record may be organized by a first objective record hierarchy specifying that the second objective record is subordinate to the first objective record.

An objective record may define a business objective comprising a progress towards fulfillment, and a subordinate objective record may define a business objective comprising a subordinate progress towards fulfillment to the subordinate business objective. An objective record hierarchy may define a relationship between objective records.

Individual objective records may include hierarchical information defining an objective record hierarchy of the individual objective records. The hierarchical information of an objective record may include one or more of information identifying other objective records associated in an objective record hierarchy the objective record belongs to, a specification of the position of the objective record in the hierarchy, other relationships placed on the objective record by virtue of its position, and/or other information.

In some implementations, as a consequence of the objective record hierarchies, the individual business objectives described in the individual objective records that are subordinate to the other individual objective records may be subordinate to the individual business objectives in the other individual objective records.

In some implementations, the one or more objective parameters may include one or more of an objective definition parameter, an objective owner parameter, an objective management parameter, an objective creation parameter, an objective progress parameter, and/or other parameters. The value of the objective definition parameter may describe the particular business objective. The values of the objective owner parameter may describe business objectives assigned to be owned by an individual user. The values of the objective management parameter may describe business objectives managed as collaborators by the individual users. The values of the objective creation parameter may describe business objectives created by the individual users.

In some implementations, the business objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing business objectives owned by the individual users may be determined based on one or more interactions by one or more users with a collaboration environment. In some implementations, one or more users may create and/or assign ownership of one or more business objectives to themselves and/or another user. In some implementations, a user may be assigned to own a business objective and the user may effectuate a reassignment of ownership of the business objective from the user or one or more other users.

In some implementations, environment state component 108 may be configured to manage information defining work unit pages corresponding to the individual units of work. Individual work unit pages may provide access to individual units of work. Managing information defining work unit pages may include determining, obtaining, and/or modifying information used to generate work unit pages. Managing information defining individual work unit pages may include providing information to the environment state component 108 to effectuate presentation of the work unit pages, and/or other information. In some implementations, individual work unit pages may include individual sets of interface elements displaying the values of one or more of the work unit parameters of the individual units of work.

In some implementations, environment state component 108 may be configured to manage information defining project pages corresponding to the individual projects. Individual project pages may provide access to individual project. Managing information defining project pages may include determining, obtaining, and/or modifying information used to generate project pages. Managing information defining individual project pages may include providing information to the environment state component 108 to effectuate presentation of the project pages, and/or other information. In some implementations, individual project pages may include individual sets of interface elements displaying the values of one or more of the project parameters of the individual projects.

The user input component 110 may be configured to obtain input information conveying user input into work unit pages of the units of work and/or project pages of the individual projects. The user input may include requests to generate meetings regarding the individual units of work and/or individual projects with one or more of the users of the collaboration environment. In some implementations, the one or more users may be users linked to the individual units of work and/or projects. By way of non-limiting illustration, input information may convey a first user input by the first user into a first work unit page of the first unit of work. The first user input may include a first request to generate a first meeting regarding the first unit of work with a second user and/or other users. The second user may be linked to the first unit of work. By way of non-limiting illustration, the second user may be an assignee of the first unit of work.

In some implementations, the environment state component 108 may be configured to, in response to the requests to generate the meetings regarding the individual units of work, generate and/or store resource information in individual work unit records of the individual units of work and/or individual project records of the individual projects. The resource information may include one or more of meeting resource identifiers that facilitate access to a meeting interface, agenda information, digital content item(s), and/or other information. A resource identifier may include one or more of a pointer, a hyperlink, and/or other identifier configured to provide access to a meeting interface of a meeting resource. Providing access may include effectuating presentation of a meeting interface.

Storing the resource information in the individual work unit records of the individual units of work may cause individual meeting resource identifiers to be presented in the individual work unit pages. Storing the resource information in the individual project records of the individual projects may cause individual meeting resource identifiers to be presented in the individual project pages. By way of non-limiting illustration, in response to the first request, first resource information may be stored in the first work unit record. The first resource information may include a first meeting resource identifier. The first meeting resource identifier may be presented in the first work unit page.

In some implementations, resource information may include digital content items relevant to individual units of work, individual projects, and/or other information. The digital content items may include one or more of text documents, video files, audio files, and/or other items.

In some implementations, the user input component 110 may be configured to generate agenda information for the meetings. The agenda information for the individual meeting may include individual sets of agenda items. Individual agenda items may correspond to one or more of an individual work unit record, an individual project record, an individual objective records, an individual user record, and/or other information. The individual agenda items may include and/or facilitate access to the corresponding ones the records. For example, an individual agenda item may include a corresponding work unit record on the agenda and/or the individual agenda item may include a link (e.g., hyperlink, pointer, resource identifier, etc.) to access the corresponding work unit record. In some implementations, the corresponding record included on the agenda may include one or more of a summary of the record, a copy of the record, an instance of a record, and/or other information. A summary of a record may include values of a subset of parameters deemed of most importance. Importance may be specified by a user and/or an administrator of the system. In some implementations, a copy of a record may be utilized to ensure the actual record is not accidentally modified, deleted, and/or otherwise interacted with in unintended ways. In some implementations, an instance of a record may include the record as represented in the collaboration environment. By way of non-limiting illustration, an instance of a record may be modified, deleted, and/or otherwise interacted with, where results of such interactions may be reflected in the collaboration environment. By way of non-limiting illustration, the first agenda information for the first meeting may be generated. The first agenda information may include a first set of agenda items.

In some implementations, the agenda information may be generated based on user input and/or automatically based on the work information of the individual units of work and/or project information for the individual projects. By way of non-limiting illustration, the first set of agenda items may be generated based on user input by the first user and/or automatically based on the first work information and/or other information. The first set of agenda items may include one or more of resource information, work information for the first unit of work, user information for users linked to the first unit of work, project information for projects supported by the first unit of work, objective information for business objectives supported by the first unit of work, and/or other information linked to the first unit of work.

In some implementations, the input by the first user may include selecting one or more agenda items to be prioritized in the agenda, selecting one or more users linked to the unit of work to be included in the meeting, a date and/or time for the meeting, and/or other input.

In some implementations, user input component 110 may be configured to obtain input information and/or other information. The input information may convey user input into the user interface presented on the client computing platform(s) 104. A set of user interface elements may be provided on the user interface to facilitate the user input and/or other user interaction with the user interface. The user interface elements may include one or more of text input fields, drop down menus, check boxes, display windows, virtual buttons, and/or other elements configured to facilitate user interaction.

The meeting interface component 112 may be configured to effectuate presentation of a meeting interface through which the users conduct meetings. In some implementations, the meeting interface may be presented in response to selection of a resource identifier. In some implementations, the meeting interface may be presented in response to occurrence of a date and/or time of the meeting.

The meeting interface may include an agenda display portion displaying the agenda information for the individual meetings, and/or other portions displaying other content. The meeting interface may be presented based on information received from, and/or communicated to, an individual meeting resource. By way of non-limiting illustration, the meeting interface for the first meeting presented to the first user, the second user, and/or other users may include the agenda display portion displaying the first set of agenda items. By way of non-limiting illustration, the meeting interface may be comprised of a video conference portion taking up a portion of the meeting interface so that another portion may be the agenda display portion. The agenda display portion may be a set size, in a set position in the meeting interface or the user may customize the size and/or positioning of the agenda display portion where a majority of the meeting interface is the agenda display portion, and the video conference may be smaller with respect to the agenda display portion.

The content component 114 may be configured to obtain meeting information conveying content of the meetings. The meeting information may include one or more of user input information, audio information, video information, and/or other meeting information. By way of non-limiting illustration, first meeting information conveying first content of the first meeting may be obtained.

The video information may characterize video content of the meetings. The video content of the meetings may comprise visual content, audio content, and/or other content. The visual content may include visual representations of the individual users during the meetings, and/or other visual content. The audio content may include speech (e.g., words, phrases, noises, etc.) of the individual users during the meetings and/or other audio content. In some implementations, video content of the meetings may be derived from the video information based on one or more video processing techniques through which individual ones of the visual content, audio content, and/or other content may be determined. The audio information may characterize audio content of the meetings.

In some implementations, user input information may characterize user input into the agenda display portion and/or other portions of the meeting interface. In some implementations, the user input into the agenda display portion may include input that may be the same as or similar to user input provided into views of the collaboration environment (e.g., work unit pages and/or project pages). By way of non-limiting illustration, the user input may include one or more of adding comments, marking complete, marking incomplete, creating units of work, and/or other user input. In some implementations, user input may include textual communications between users during the meetings.

In some implementations, the environment state component 108 may be configured to determine one or more actions within the collaboration environment based on the content of the meetings and/or other information. In some implementations, an action may include one or more of generating a unit of work, generating a project, modifying a unit of work, modifying a project, and/or other actions. The environment state component 108 may be configured to effectuate one or more actions within the collaboration environment based on the content of the meetings. The environment state component 108 may be configured to store results of the one or more actions in the environment state information. By way of non-limiting illustration, a first set of one or more actions may be effectuated in the collaboration environment based on the first content, and results of the first set of one or more actions may be stored in the environment state information.

In some implementations, audio content may trigger one or more actions within the collaboration environment. The audio content triggering the one or more actions may include one or more trigger phrases and/or words. By way of non-limiting illustration, effectuating the one or more actions may be based on identifying one or more of the trigger phrases and/or words from the audio content. In some implementations, content component 114 may be configured to detect and/or identify one or more trigger phrases and/or words based on natural language processing and/or other audio processing techniques. The trigger phrases and/or words may indicate a user's request, desire, inquiry, and/or need. By way of non-limiting illustration, a unit of work and/or project may be generated based on identifying one or more of the trigger phrases and/or words from the audio content. In some implementations, trigger phrases and/or words may include one or more of "to do", "need to", "should do", "check on", "I need", "UserA should", "Did I," and/or other words and/or phrases. In some implementations, trigger phrases and/or words may be direct recitations of values of one or more work unit parameters of a unit of work to be generated. By way of non-limiting illustration, a user may directly speak a desire to generate an individual unit of work, with a specific due date, and/or assigned to a specific assignee.

In some implementations, visual content may trigger one or more actions within the collaboration environment. The visual content that triggers the one or more actions may include one or more trigger gestures and/or emotes. By way of non-limiting illustration, effectuating the one or more actions may be based on identifying one or more of the trigger gestures and/or emotes from the visual content. In some implementations, trigger gestures and/or emotes may indicate a user's request, desire, inquiry, and/or need. By way of non-limiting illustration, a trigger gesture to generate an individual unit of work may include a thumbs-up gesture and/or other gestures conveying a desire to do something they are talking about. By way of non-limiting illustration, a trigger gesture and/or emote to generate an individual unit of work with low priority may include a shaking of the head and/or other gestures conveying a desire to do something but having little importance. Trigger gestures and/or emotes may be detected and/or identified from visual content based on one or more video processing techniques.

In some implementations, user input into the agenda display portion and/or a textually communication chat portion may trigger one or more actions. In some implementations, the actions triggered by user input into the agenda display portion may be the same as or similar to input into work unit pages and/or project pages of the collaboration environment.

In some implementations, the meetings may be related to and/or specific to a given project and/or unit of work within the collaboration environment. As such, a user participating in a given meeting may be working on and/or discussing a related and/or specific project and/or unit of work. Content component 114 may be configured to transcribe one or more spoken communications. In some implementations, content component 114 may be configured to determine a source and/or intended recipient of spoken requests within the meeting.

Environment state component 108 may be configured to effectuate the determined one or more actions within the collaboration environment, and store results of the one or more actions in the environment state information. By way of non-limiting illustration, one or more units of work and/or projects for the individual users may be generated based on the content of the meetings by storing information defining the units of work and/or projects as part of the environment state information. Such generation may be responsive to detection of completion of the meeting and/or in real time (or near real time) during the course of the meeting. Generating the individual units of work and/or projects may include automatically generating one or more values of one or more parameters. By way of non-limiting illustration, the first set of one or more actions may include generating a second unit of work and/or one or more values of one or more work unit parameters of the second unit of work.

In some implementations, environment state component 108 may be configured to modify the individual units of work and/or projects based on the content of the meetings by storing information defining modifications as part of the environment state information. Modifying units of work and/or projects may include one or more of changing, adjusting, adding, and/or removing one or more characteristics associated with individual ones of the units of work and/or projects. By way of non-limiting example, the one or more characteristics of a unit of work may include one or more of a description, an assignee, a due date, a start date, and/or other characteristics. Environment state component 108 may be configured to store information defining modifications of the as part of the environment state information. By way of non-limiting illustration, the first set of one or more actions may modify the first unit of work. Information defining the modification may be stored in the first work unit record.

In some implementations, generating units of work and/or projects may be based on the content from the meetings may include automatically generating one or more values of one or more parameters. Generating the individual units of work based on the content from the meetings may include automatically initiating the one or more individual units of work, and/or automatically generating one or more values of one or more work unit parameters describing the individual units of work. In some implementations, the one or more values of the one or more work unit parameters may include one or more of a title, a description, a due-date, an assignee, a start date, a project and/or individual unit of work associated with the generated individual unit of work, a dependency within a hierarchy, and/or other values.

In some implementations, the individual units of work may be generated in real-time and/or near real-time during the meeting. By way of non-limiting example, as the user starts speaking within the video interface, content component 114 may identify one or more individual units of work that should be generated. The individual units of work, in some implementations, may be generated at or near the conclusion of the meetings. In some implementations, one or more actions may be presented to one or more of the users as one or more potential actions. The potential actions may be presented to the one or more users for confirmation and/or acceptance. One or more of the users may accept and/or confirm one or more of the potential actions at the conclusion of the given meeting. A meeting may conclude when: a threshold amount of time passes without any communication from one or more users, a user exits or closes the meeting interface, the user minimizes the meeting interface, the user responds to a request with acceptance language and/or the user otherwise concludes the meeting.

One or more actions may be carried out based on context of the meetings. In some implementations, content component 114 may be configured to determine context of the meetings from the meeting information. Context may include one or more of user information for a user participating in the meeting, user information for one or more users identified in the meeting, and/or other context information. By way of non-limiting illustration, image-processing techniques, such as facial recognition, may be used to identify a user of a meeting. User information for the user may then be obtained.

In some implementations, content component 114 may be configured to identify individual users of the meetings based on the context of the meetings and/or other content. The individual users may be identified based on the audio content (e.g., a spoken name) and/or the visual content (e.g., appearing in the meeting).

In some implementations, content component 114 may identify one or more recommended actions that should and/or could be carried out. The content component 114 may be configured to effectuate presentation of one or more recommendation including one or more prompts for carrying out the one or more actions. By way of non-limiting example, if a user starts speaking "I need to follow-up with X supplier . . . ", content component 114 may prompt the user with a recommendation for generating a corresponding unit of work. The prompt may be presented within the meeting interface in real time and/or near real time during the meeting. The user may be able to provide entry and/or selection to accept and/or deny recommendations. By way of non-limiting illustration, content component 114 may generate the unit of work for following-up with X supplier based on the responses to these prompts.

In some implementations, individual actions may be automatically carried out and/or accepted by the users. By way of non-limiting example, the content component 114 may be configured to identify acceptance language. Responsive to the content component 114 identifying acceptance language, content component 114 may automatically accept one or more actions and instruct environment state component 108 to carry it out. Acceptance may be provided through selection of a user interface element (e.g., a virtual button).

Content component 114 may be configured to store the meeting information as part of the environment state information. Such storage may be responsive to detection of completion of the meetings. As such, the meeting information may be included in the one or more work unit records and/or project records.

The content component 114 may be configured to store trigger information. The trigger information may include trigger gestures and/or emotes, and/or trigger phrases and/or words, and the corresponding actions that may be carried out. In some implementation, the trigger gestures and/or emotes, and/or trigger phrases and/or words, may be user-specific and/or system-wide. In some implementations, the trigger gestures and/or emotes, and/or trigger phrases and/or words, may be set by users and stored within the user records for the users. In some implementations, the content component 116 may be configured to determine trigger gestures and/or emotes, and/or trigger phrases and/or words, through one or more machine learning techniques. By way of non-limiting illustration, a user may go through a training process where a meeting and desired units of work are provided as input to train a machine learning model.

In some implementations, environment state information may be updated as users continue to interact with the collaboration environment via the user interfaces over time. The environment state component 108 may store and/or archive the environment state information periodically and/or based on user request to archive. In some implementations, the environment state component 108 may store historical environment state information specifying historical user information, historical work information, historical project information, historical objective information, user interaction history, and/or other information.

Figure 3:
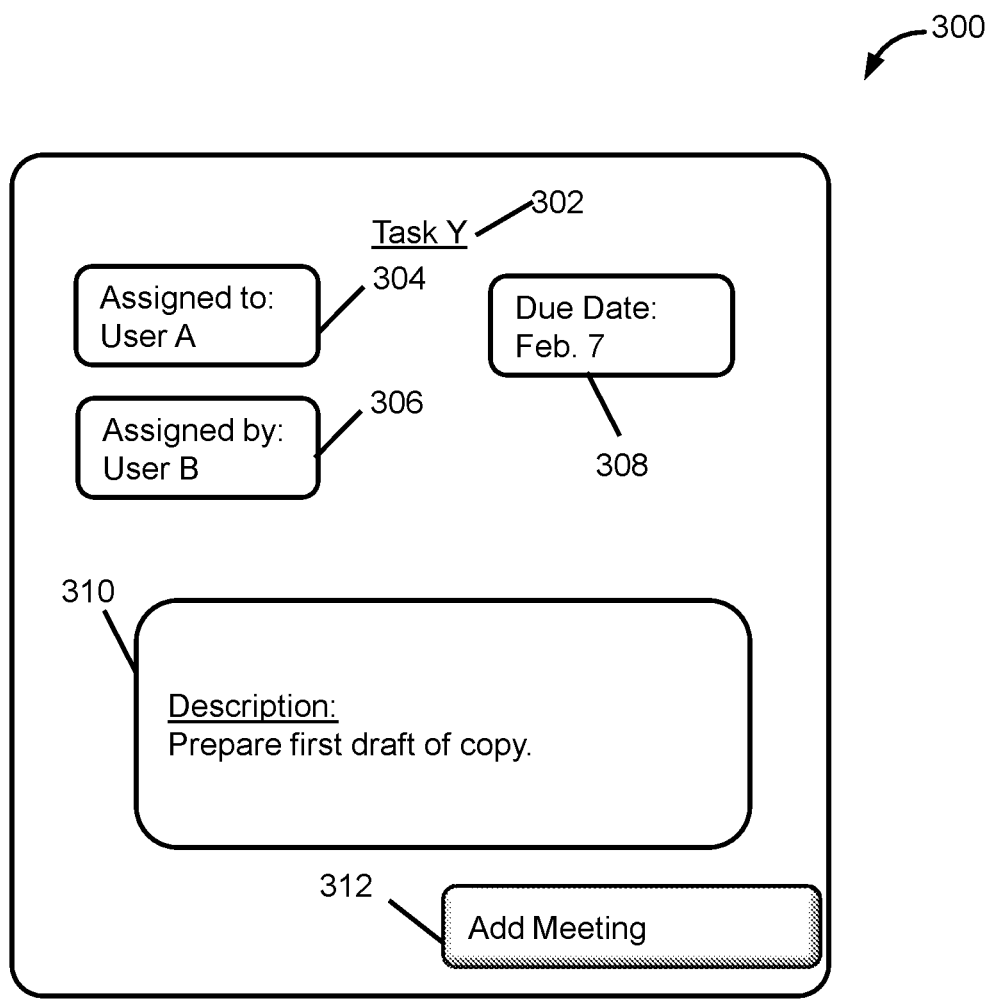
FIG. 3 illustrates a user interface, in accordance with one or more implementations.

FIG. 3 illustrates a user interface 300 of a collaboration environment, in accordance with one or more implementations. The user interface 300 may display a work unit page for a first unit of work. The user interface 300 may display different values of one or more work unit parameters of the first unit of work, and/or other information. By way of non-limiting illustration, a user interface element 302 may display a title of the first unit of work (e.g., Task Y). A user interface element 304 may display an assignee of the first unit of work (e.g., User A). A user interface element 306 may display an assignor of the first unit of work (e.g., User B). A user interface element 308 may display a due date of the first unit of work. A user interface element 310 may display a description of the first unit of work. A user interface element 312 may be configured to obtain user input causing a request to generate a meeting regarding the first unit of work with one or more of the users of the collaboration environment. The one or more users may include user linked to the first unit of work. The one or more users linked to the first unit of work may include one or more of the assignee, assignor, and/or other users linked to the first unit of work. The users linked to the first unit of work may default to one or more of the assignee, assignor, a manager, a creator, and/or other users linked to the first unit of work. It is noted that FIG. 3 is for illustrative purposes only and is not to be considered limiting. Instead, it is to be understood that the user interface 300 may be configured in other ways and/or including other elements in accordance with one or more implementations of the system 100 presented herein.

Figure 4:
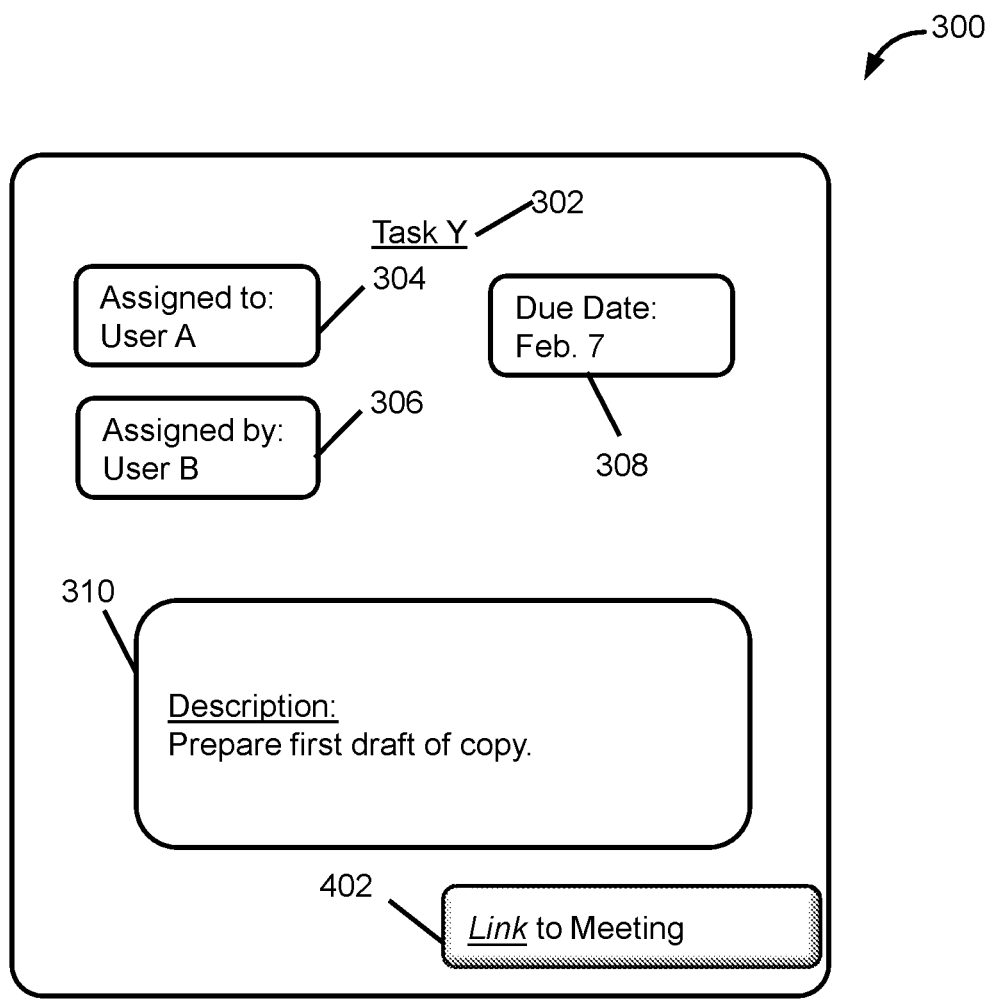
FIG. 4 illustrates a user interface, in accordance with one or more implementations.

FIG. 4 illustrates the user interface 300 in response to the request to generate the meeting, in accordance with one or more implementations. By way of non-limiting illustration, the user interface 300 may include a resource identifier 402 for the meeting. The resource identifier 402 may facilitate access to a meeting interface (see, e.g., FIG. 5) for the meeting.

Figure 5:
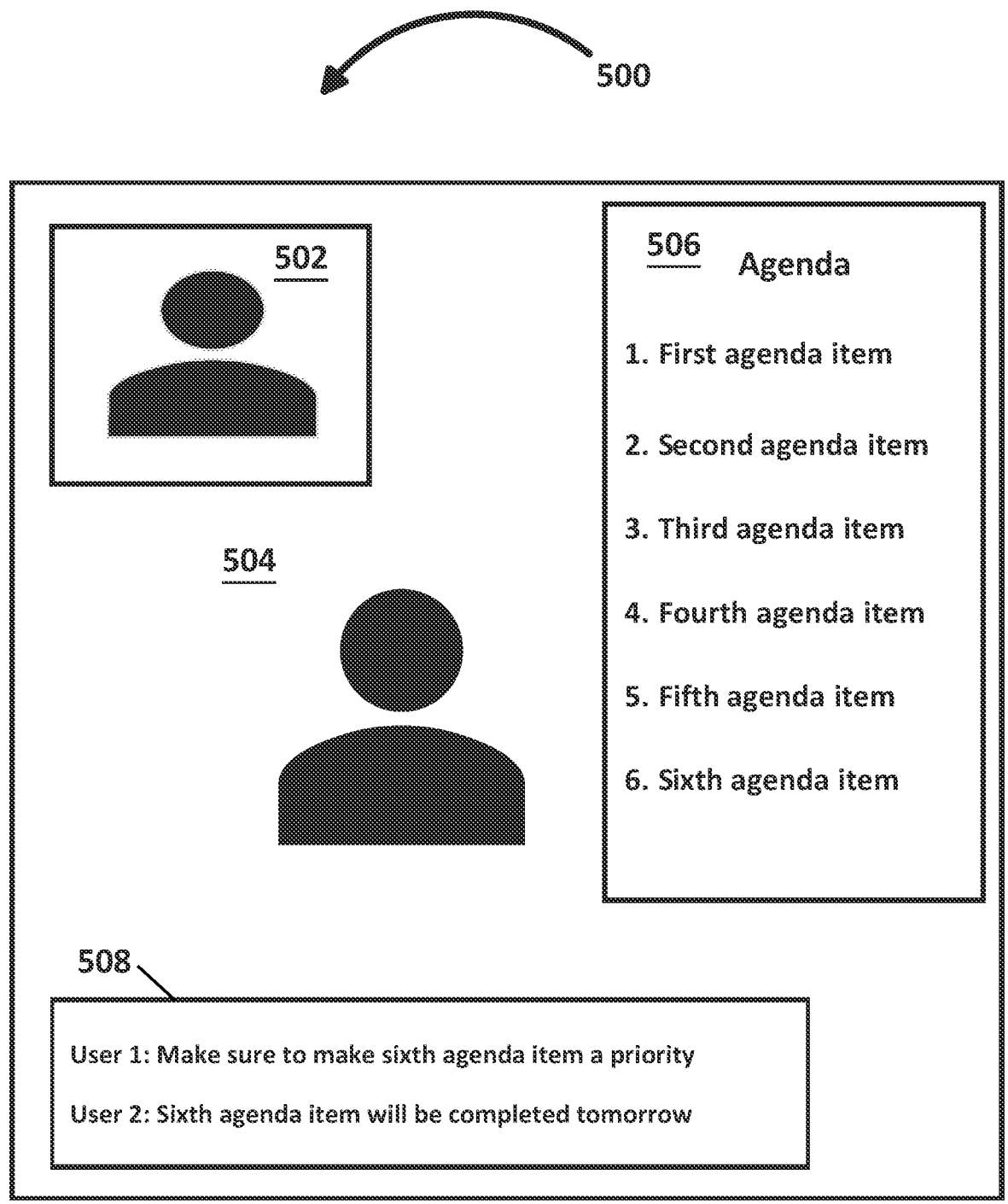
FIG. 5 illustrates a user interface, in accordance with one or more implementations.

FIG. 5 illustrates a meeting interface 500, in accordance with one or more implementations. In some implementations, the meeting interface 500 may include presenting a view of a meeting where there is a second user 504 being shown and a first user 502 who is viewing the current video perspective. In some implementations, the meeting interface 500 may include an agenda display portion 506 presenting a list of agenda items that are to be discussed during the meeting. In some implementations, there may be a textual communication portion 508 where the users of the meeting may also use to communicate. One or more actions may be effectuated within the collaboration environment based on content of the meeting via the meeting interface 500.

Referring back to FIG. 1, in some implementations, server(s) 102, client computing platform(s) 104, meeting resource(s) 125, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, meeting resource(s) 125, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resource(s) 126 may include sources of information outside of system 100, external entities participating with system 100, a meeting resource, and/or other resources. In some implementations, some or all of the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112 and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
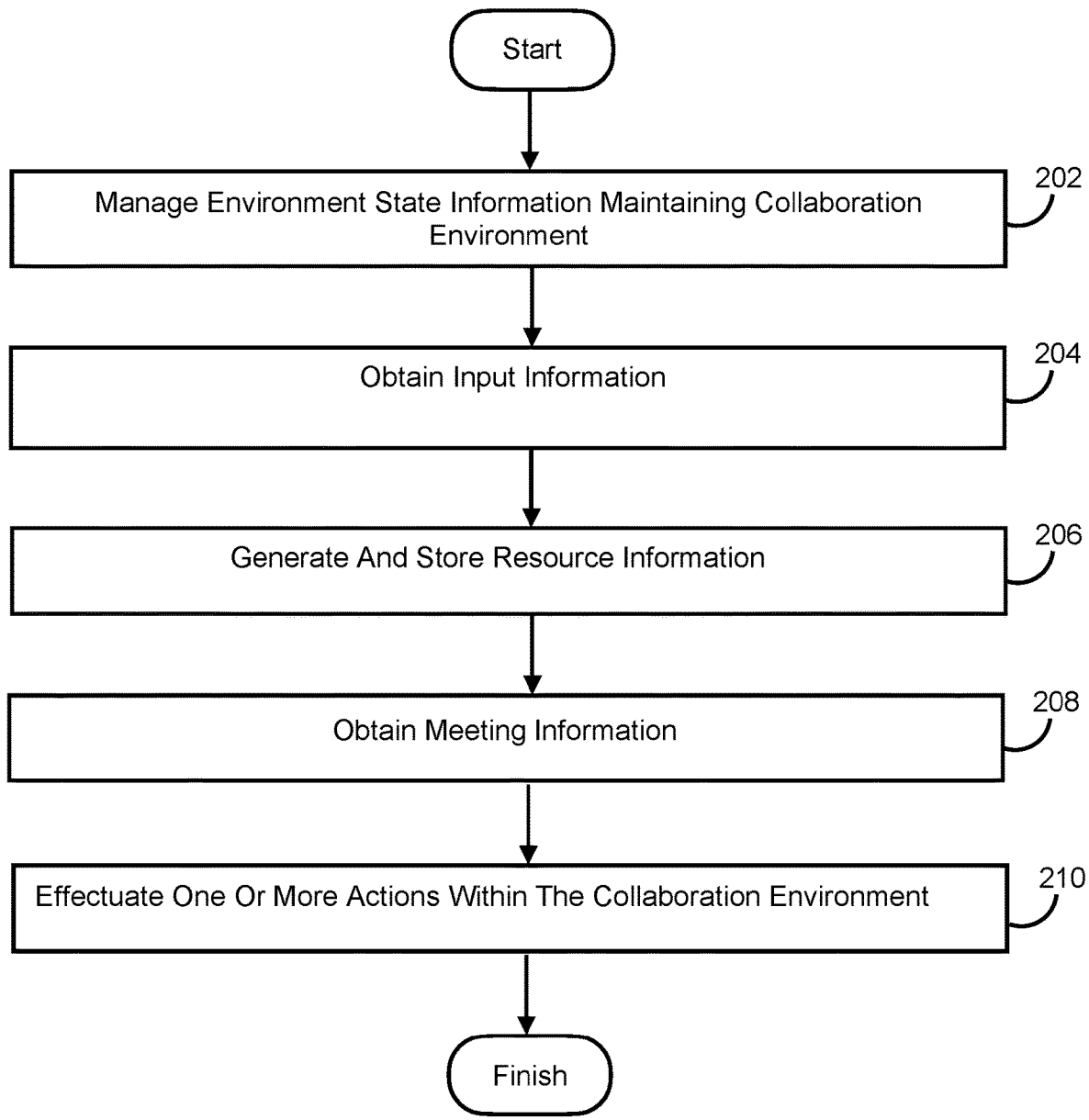
FIG. 2 illustrates a method to link meetings with units of work of a collaboration environment, in accordance with one or more implementations.

FIG. 2 illustrates a method 200 to link meetings with units of work of a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment and/or other information. The collaboration environment may be configured to facilitate interaction by users with the collaboration environment. The environment state information may include work unit records, project records, and/or other records. The work unit records may include values of work unit parameters associated with units of work managed, created, and/or assigned within the collaboration environment. The project records may include values for the project parameters associated with projects managed within the collaboration environment. An individual project may include an individual set of the units of work. Operation 202 may be performed by one or more hardware processors configured by machine-readable instructions including a component that is the same as or similar to environment state component 108, in accordance with one or more implementations.

An operation 204 may obtain user input information conveying user input into work unit pages of the units of work. Individual work unit pages may provide access to individual units of work. The user input may include requests to generate meetings regarding the individual units of work with one or more of the users of the collaboration environment. The input information may convey first user input by first user into a first work unit page of the first unit of work. The first user input may include a first request to generate a first meeting regarding the first unit of work with a second user. Operation 204 may be performed by one or more hardware processors configured by machine-readable instructions including a component that is the same as or similar to user input component 110, in accordance with one or more implementations.

An operation 206 may generate and/or store resource information. Resource information may be stored in individual work unit records of the individual units of work. The resource information may include meeting resource identifiers that facilitate access to a meeting interface and/or other information. Storing the resource information in the individual work unit records of the individual units of work may cause individual meeting resource identifiers to be presented in the individual work unit pages. By way of non-limiting illustration, in response to the first request, first resource information may be stored in the first work unit records. The first resource information may include a first meeting resource identifier. Operation 206 may be performed by one or more hardware processors configured by machine-readable instructions including a component that is the same as or similar to environment state component 108, in accordance with one or more implementations.

An operation 208 may obtain meeting information conveying content of the meetings. By way of non-limiting illustration, first meeting information may convey first content of the first meeting information. Operation 208 may be performed by one or more hardware processors configured by machine-readable instructions including a component that is the same as or similar to content component 114, in accordance with one or more implementations.

An operation 210 may effectuate one or more actions within the collaboration environment based on the content of the meetings. Results of the one or more actions may be stored in the environment state information. By way of non-limiting illustration, a first set of one or more actions may be effectuated in the collaboration environment based on the first content. Results of the first set of one or more actions may be stored in the environment state information. Operation 210 may be performed by one or more hardware processors configured by machine-readable instructions including a component that is the same as or similar to environment state component 108, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to link meetings with work unit records of a collaboration environment, the system comprising:

one or more physical processors configured by machine-readable instructions to:

manage environment state information maintaining a collaboration environment, the collaboration environment being configured to facilitate interaction by users with the collaboration environment, the environment state information including work unit records, the work unit records including work information associated with units of work managed, created, and/or assigned within the collaboration environment, the work unit records including a first work unit record including first work information for a first unit of work;

in response to requests to initiate meetings regarding individual work unit records, generate and store resource information in the individual work unit records, the resource information including meeting resource identifiers that facilitate access to a video-conferencing meeting interface through which the users conduct the meetings, wherein the video-conferencing meeting interface is hosted by a video-conferencing application which is separate and distinct from the collaboration environment, such that in response to a first request by a first user to initiate a first meeting regarding the first work unit record with a second user, first resource information is generated and stored in the first work unit record, the first resource information including a first meeting resource identifier that facilitates access to the video-conferencing meeting interface;

effectuate presentation of work unit pages of the collaboration environment such that the work unit pages display the meeting resource identifiers that facilitate access to the video-conferencing meeting interface, such that presentation of a first work unit page for the first work unit record is effectuated so that the first work unit page displays the first meeting resource identifier;

responsive to selection of the meeting resource identifiers displayed in the work unit pages, effectuate presentation of the video-conferencing meeting interface by accessing the video-conferencing application, such that responsive to selection of the first meeting resource identifier from the first work unit page by the first user and/or the second user, presentation of the video-conferencing meeting interface is effectuated; and effectuate one or more actions within the collaboration environment based on content of the meetings conducted through the video-conferencing meeting interface, and store results of the one or more actions in the environment state information, such that a first set of one or more actions is effectuated in the collaboration environment based on first content of the first meeting, and results of the first set of one or more actions are stored in the environment state information.

2. The system of claim 1, wherein the one or more physical processors are further configured by the machine-readable instructions to:

generate agenda information for the meetings, the agenda information for individual meetings including individual sets of agenda items, such that first agenda information for the first meeting is generated, the first agenda information including a first set of agenda items.

3. The system of claim 2, wherein the agenda information is generated based on user input and/or automatically based on the work information of the individual work unit records, such that the first set of agenda items is generated based on first user input by the first user and/or automatically based on the first work information.

4. The system of claim 2, wherein the video-conferencing meeting interface includes an agenda display portion displaying the agenda information for the individual meetings, such that the video-conferencing meeting interface presented to the first user includes the agenda display portion displaying the first set of agenda items.

5. The system of claim 4, wherein the content of the meetings is derived from further user input into the agenda display portion of the video-conferencing meeting interface, and wherein the one or more physical processors are further configured by the machine-readable instructions to:

determine the one or more actions from the further user input into the agenda display portion of the video-conferencing meeting interface.

6. The system of claim 1, wherein the one or more physical processors are further configured by the machine-readable instructions to:

obtain meeting information conveying the content of the meetings conducted through the video-conferencing meeting interface, such that first meeting information conveying the first content of the first meeting is obtained; and wherein the content of the meetings includes audio content, wherein the audio content that triggers the one or more actions includes one or more trigger phrases and/or words, such that effectuating the one or more actions is based on identifying one or more of the trigger phrases and/or words from the audio content.

7. The system of claim 1, wherein the one or more physical processors are further configured by the machine-readable instructions to:
  obtain meeting information conveying the content of the meetings conducted through the video-conferencing meeting interface, such that first meeting information conveying the first content of the first meeting is obtained; and
  wherein the content of the meetings includes visual content, wherein the visual content that triggers the one or more actions includes one or more trigger gestures and/or emotes, such that effectuating the one or more actions is based on identifying one or more of the trigger gestures and/or emotes from the visual content.

8. The system of claim 1, wherein the one or more actions include:
  generating the individual work unit records for the individual users based on the content of the meetings by storing information defining the individual work unit records as part of the environment state information; and/or
  modifying the individual work unit records based on the content of the meetings by storing information defining modifications of the individual work unit records as part of the environment state information.

9. The system of claim 8, wherein the one or more actions include the generating the individual work unit records, and wherein the individual work unit records are generated based on context of the meetings.

10. The system of claim 1, wherein the one or more physical processors are further configured by the machine-readable instructions to:
  obtain input information conveying user input into the work unit pages of the collaboration environment, individual work unit pages providing access to the individual work unit records, the user input conveying the requests to initiate the meetings regarding the individual work unit records with one or more of the users of the collaboration environment, the input information conveying first user input by the first user into the first work unit page of the first work unit record, the first user input including the first request to initiate the first meeting regarding the first work unit record with the second user.

11. A method to link meetings with work unit records of a collaboration environment, the method comprising:
  managing environment state information maintaining a collaboration environment, the collaboration environment being configured to facilitate interaction by users with the collaboration environment, the environment state information including work unit records, the work unit records including work information associated with units of work managed, created, and/or assigned within the collaboration environment, the work unit records including a first work unit record including first work information for a first unit of work;
  in response to requests to initiate meetings regarding individual work unit records, generating and storing resource information in the individual work unit records, the resource information including meeting resource identifiers that facilitate access to a video-conferencing meeting interface through which the users conduct the meetings, wherein the video-conferencing meeting interface is hosted by a video-conferencing application which is separate and distinct from the collaboration environment, including in response to a first request by a first user to initiate a first meeting regarding the first work unit record with a second user, generating first resource information and storing the first resource information in the first work unit record, the first resource information including a first meeting resource identifier that facilitates access to the video-conferencing meeting interface;
  effectuating presentation of work unit pages of the collaboration environment such that the work unit pages display the meeting resource identifiers that facilitate access to the video-conferencing meeting interface, including effectuating presentation of a first work unit page for the first work unit record so that the first work unit page displays the first meeting resource identifier;
  responsive to selection of the meeting resource identifiers displayed in the work unit pages, effectuating presentation of the video-conferencing meeting interface by accessing the video-conferencing application, including responsive to selection of the first meeting resource identifier from the first work unit page by the first user and/or the second user, effectuating presentation of the video-conferencing meeting interface; and
  effectuating one or more actions within the collaboration environment based on content of the meetings conducted through the video-conferencing meeting interface, and storing results of the one or more actions in the environment state information, including effectuating a first set of one or more actions in the collaboration environment based on first content of the first meeting, and storing results of the first set of one or more actions in the environment state information.

12. The method of claim 11, further comprising:
  generating agenda information for the meetings, the agenda information for individual meetings including individual sets of agenda items, including generating first agenda information for the first meeting, the first agenda information including a first set of agenda items.

13. The method of claim 12, wherein the agenda information is generated based on user input and/or automatically based on the work information of the individual work unit records, such that the first set of agenda items is generated based on first user input by the first user and/or automatically based on the first work information.

14. The method of claim 12, wherein the video-conferencing meeting interface includes an agenda display portion displaying the agenda information for the individual meetings, such that the video-conferencing meeting interface presented to the first user includes the agenda display portion displaying the first set of agenda items.

15. The method of claim 14, wherein the content of the meetings is derived from further user input into the agenda display portion of the video-conferencing meeting interface, and wherein the method further comprises:
  determining the one or more actions from the further user input into the agenda display portion of the video-conferencing meeting interface.

16. The method of claim 11, further comprising:
  obtaining meeting information conveying the content of the meetings conducted through the video-conferencing meeting interface, including obtaining first meeting information conveying the first content of the first meeting; and
  wherein the content of the meetings includes audio content, wherein the audio content that triggers the one or more actions includes one or more trigger phrases and/or words, such that the effectuating the one or more actions is based on identifying one or more of the trigger phrases and/or words from the audio content.

17. The method of claim 11, further comprising:
obtaining meeting information conveying the content of the meetings conducted through the video-conferencing meeting interface, including obtaining first meeting information conveying the first content of the first meeting; and
wherein the content of the meetings includes visual content, wherein the visual content that triggers the one or more actions includes one or more trigger gestures and/or emotes, such that the effectuating the one or more actions is based on identifying one or more of the trigger gestures and/or emotes from the visual content.

18. The method of claim 11, wherein the one or more actions include:
generating the individual work unit records for the individual users based on the content of the meetings by storing information defining the individual work unit records as part of the environment state information; and/or
modifying the individual work unit records based on the content of the meetings by storing information defining modifications of the individual work unit records as part of the environment state information.

19. The method of claim 18, wherein the one or more actions include the generating the individual work unit records, and wherein the individual work unit records are generated based on context of the meetings.

20. The method of claim 11, further comprising:
obtaining input information conveying user input into the work unit pages of the collaboration environment, individual work unit pages providing access to the individual work unit records, the user input conveying the requests to initiate the meetings regarding the individual work unit records with one or more of the users of the collaboration environment, including obtaining the input information conveying first user input by the first user into the first work unit page of the first work unit record, the first user input including the first request to initiate the first meeting regarding the first work unit record with the second user.

* * * * *